United States Patent
Kudo et al.

(10) Patent No.: US 12,226,980 B2
(45) Date of Patent: Feb. 18, 2025

(54) LAMINATE

(71) Applicant: TOPPAN INC., Tokyo (JP)

(72) Inventors: Shigeki Kudo, Tokyo (JP); Haruna Kadoya, Tokyo (JP)

(73) Assignee: TOPPAN INC., Tokyo (JP)

( * ) Notice: Subject to any disclaimer, the term of this patent is extended or adjusted under 35 U.S.C. 154(b) by 240 days.

(21) Appl. No.: 17/841,027

(22) Filed: Jun. 15, 2022

(65) Prior Publication Data

US 2022/0314589 A1 Oct. 6, 2022

Related U.S. Application Data

(63) Continuation of application No. PCT/JP2020/046376, filed on Dec. 11, 2020.

(30) Foreign Application Priority Data

Dec. 18, 2019 (JP) .................................. 2019-228058

(51) Int. Cl.
*B32B 27/08* (2006.01)
*B32B 7/12* (2006.01)
(Continued)

(52) U.S. Cl.
CPC ................ *B32B 27/08* (2013.01); *B32B 7/12* (2013.01); *B32B 37/06* (2013.01);
(Continued)

(58) Field of Classification Search
CPC .............. B32B 7/12; B32B 2307/31; B32B 2307/7244; B32B 2439/46; Y02W 30/80
See application file for complete search history.

(56) References Cited

U.S. PATENT DOCUMENTS

2002/0012807 A1  1/2002 Kurian et al.
2006/0246242 A1* 11/2006 Siegel ................ B32B 27/00
                                              428/34.1
(Continued)

FOREIGN PATENT DOCUMENTS

JP  H04-025455 A  1/1992
JP  H10-166535 A  6/1998
(Continued)

OTHER PUBLICATIONS

Mallapragada et. al., Encyclopedia of Analytical Crystallinity (Year: 2006).*

(Continued)

*Primary Examiner* — Alison L Hindenlang
*Assistant Examiner* — Debjani Roy
(74) *Attorney, Agent, or Firm* — Foley & Lardner LLP

(57) ABSTRACT

A laminate for forming a packaging bag, in sequence: a substrate layer; an adhesive layer; and a sealant layer, wherein the sealant layer includes a first polyester film having a crystallinity of 20 to 50% based on a first absorbance at a first wavenumber of 1409 cm$^{-1}$, a second absorbance at a second wavenumber of 1370 cm$^{-1}$, a third absorbance at a third wavenumber of 1340 cm$^{-1}$, a first constant, and a second constant, the first to third absorbances and the first and second constants being determined based on FT-IR analysis, which uses a reflection method, on at least the first polyester film, the crystallinity of the first polyester film being expressed in accordance with the following formulas (1) and (2): $I_{1409}=p1\times I_{1340}+p2\times I_{1370}$ ... (Formula 1) and $C=p1\times(I_{1340}/I_{1409})\times 100$ ... (Formula 2).

15 Claims, 2 Drawing Sheets

(51) Int. Cl.
  *B32B 37/06* (2006.01)
  *B32B 37/24* (2006.01)

(52) U.S. Cl.
  CPC ... *B32B 2037/246* (2013.01); *B32B 2250/244* (2013.01); *B32B 2307/704* (2013.01); *B32B 2307/7246* (2013.01); *B32B 2439/46* (2013.01)

(56) References Cited

U.S. PATENT DOCUMENTS

| 2021/0101379 A1* | 4/2021 | Ishimaru | B65D 65/40 |
| 2021/0213715 A1* | 7/2021 | Sugaya | B32B 27/306 |

FOREIGN PATENT DOCUMENTS

| JP | 2004-530000 A | 9/2004 | | |
| JP | 2015-196512 A | 11/2015 | | |
| WO | WO-2008/008381 A2 | 1/2008 | | |
| WO | WO-2018/016521 A1 | 1/2018 | | |
| WO | WO-2018/132442 A1 | 7/2018 | | |
| WO | WO-2018/150997 A1 | 8/2018 | | |
| WO | WO-2019187970 A1 * | 10/2019 | | B32B 15/08 |

OTHER PUBLICATIONS

Bertoldo et. al., Polymer (Year: 2010).*
Office Action issued in corresponding Chinese Patent Application No. 202080087238.6 dated Oct. 23, 2023 (13 pages).
International Searching Authority, "International Search Report," issued in connection with International Patent Application No. PCT/JP2020/046376, dated Mar. 16, 2021, 5 pages.
International Searching Authority, "Written Opinion," issued in connection with International Patent Application No. JP2020/046376, dated Mar. 16, 2021, 5 pages.
Extended European Search Report issued in connection with EP Appl. Ser. No. 20903571.6 dated Dec. 12, 2022 (53 pages).

* cited by examiner

LAMINATE

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2020/046376, filed on Dec. 11, 2020, which in turn claims the benefit of JP 2019-228058, filed Dec. 18, 2019; the disclosures of all which are incorporated herein by reference in its entirety.

TECHNICAL FIELD

The present invention relates to laminates.

BACKGROUND

Films of polyester, typified by polyethylene terephthalate, have excellent low adsorptivity to organic compounds contained in, for example, chemicals, pharmaceuticals, and foods. In terms of the above property, such a film is suitable for use as the innermost sealant layer of a packaging bag.

CITATION LIST

[Patent Literature] PTL 1: JP 2004-530000 A

SUMMARY OF THE INVENTION

Technical Problem

Unfortunately, mechanical properties of polyester films are deteriorated by acidic or alkaline hydrolysis. Therefore, when such a film is used as the innermost layer of a packaging bag, there is a limitation on the type of substances that can be contained in the bag. Further studies are needed to produce packaging bags for, for example, toiletries, such as shampoo and detergents, which are generally considered to be stored for a long period of time.

The present invention has been made in view of the above circumstances. The present invention aims to provide a laminate that includes a sealant layer comprised of a polyester film and that can be used to form a packaging bag suitable for long-term storage of acidic or alkaline substances.

Solution to Problem

One aspect of the present invention provides a laminate for forming a bag for use as packaging of an acidic or alkaline substance, the laminate including, in sequence: a substrate layer; an adhesive layer; and a sealant layer, wherein the sealant layer includes a first polyester film, and the first polyester film has a crystallinity of 20 to 50%, the crystallinity of the first polyester film being defined based on a first absorbance at a first wavenumber of 1409 $cm^{-1}$, a second absorbance at a second wavenumber of 1370 $cm^{-1}$, a third absorbance at a third wavenumber of 1340 $cm^{-1}$, a first constant, and a second constant, the first to third absorbances and the first and second constants being determined based on Fourier transform infrared (FT-IR) analysis, which uses a reflection method, on at least the first polyester film, the crystallinity of the first polyester film being expressed in accordance with the following formulas (1) and (2):

$$I_{1409} = p1 \times I_{1340} + p2 \times I_{1370} \quad \text{(Formula 1)}$$

$$C = p1 \times (I_{1340}/I_{1409}) \times 100 \quad \text{(Formula 2)}$$

where
C represents the crystallinity in percent,
$I_{1409}$ represents the first absorbance at the first wavenumber,
$I_{1370}$ represents the second absorbance at the second wavenumber,
$I_{1340}$ represents the third absorbance at the third wavenumber,
p1 represents the first constant, and
p2 represents the second constant,
where
1409 $cm^{-1}$: a normalization band,
1370 $cm^{-1}$: a cis-conformer band (derived from an amorphous phase), and
1340 $cm^{-1}$: a trans-conformer band (trans conformation absorption band; derived from a crystal phase).

The present invention relates in particular to a laminate that includes a specific polyester film as a sealant layer. A packaging bag formed of this laminate has suitable resistance to acidic or alkaline substances.

In the laminate of the present invention, the sealant layer may further include a second polyester film so disposed as to be farther away from the adhesive layer than the first polyester film is, the second polyester film having a crystallinity of 15% or less.

In the laminate of the present invention, the sealant layer may have a thickness of 15 μm or more.

In the laminate of the present invention, the first polyester film and the second polyester film may both have a thickness of 5 μm or more.

In the laminate of the present invention, the substrate layer may be comprised of a third polyester film.

In the laminate of the present invention, the third polyester film of the substrate layer may have a first surface and a second surface opposite to the first surface and have a vapor deposited layer of inorganic oxide disposed on at least one of the first surface and the second surface.

The laminate of the present invention may have a water vapor transmission rate of 5 $g/m^2$/day or less.

The laminate of the present invention may have an oxygen transmission rate of 1 $cc/m^2$/day or less.

In the laminate of the present invention, the substance may contain a surfactant.

Advantageous Effects of Invention

The present invention provides a laminate that includes a sealant layer comprised of a polyester film and that can be used for forming a packaging bag suitable for long-term storage of acidic or alkaline substances.

DETAILED DESCRIPTION

Embodiments of the present invention will be described below with reference to the drawings. In the following description of the drawings to be referred, components or functions identical with or similar to each other are given the same or similar reference signs, unless there is a reason not to. It should be noted that the drawings are only schematically illustrated, and thus the relationship between thickness and two-dimensional size of the components, and the thickness ratio between the layers, are not to scale. Therefore, specific thicknesses and dimensions should be understood in view of the following description. As a matter of course, dimensional relationships or ratios may be different between the drawings.

Further, the embodiments described below are merely examples of configurations for embodying the technical idea of the present invention. The technical idea of the present invention does not limit the materials, shapes, structures, arrangements, and the like of the components to those described below. The technical idea of the present invention can be modified variously within the technical scope defined by the claims. The present invention is not limited to the following embodiments within the scope not departing from the spirit of the present invention. For the sake of clarity, the drawings may be illustrated in an exaggerated manner as appropriate.

In any group of successive numerical value ranges described in the present specification, the upper limit value or lower limit value of one numerical value range may be replaced with the upper limit value or lower limit value of another numerical value range. In the numerical value ranges described in the present specification, the upper limit values or lower limit values of the numerical value ranges may be replaced with values shown in examples. The configuration according to a certain embodiment may be applied to other embodiments.

The embodiments of the present invention are a group of embodiments based on a single unique invention. The aspects of the present invention are those of the group of embodiments based on a single invention. Configurations of the present invention can have aspects of the present disclosure. Features of the present invention can be combined to form the configurations. Therefore, the features of the present invention, the configurations of the present invention, the aspects of the present disclosure, and the embodiments of the present invention can be combined, and the combinations can have a synergistic function and exhibit a synergistic effect.

<Laminate>

Figure 1:
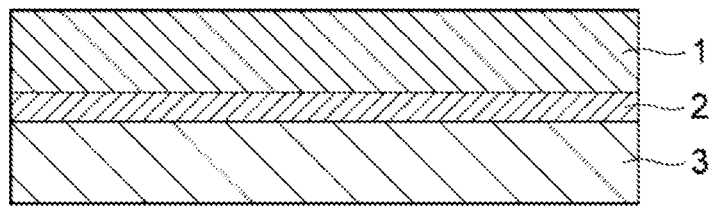
FIG. 1 is a schematic cross-sectional view illustrating a laminate according to an embodiment of the present invention.

FIG. 1 is a schematic cross-sectional view illustrating a laminate according to an embodiment of the present invention. A laminate 10 of the present embodiment includes a substrate layer 1, an adhesive layer 2, and a sealant layer 3 in this order.

Figure 2:
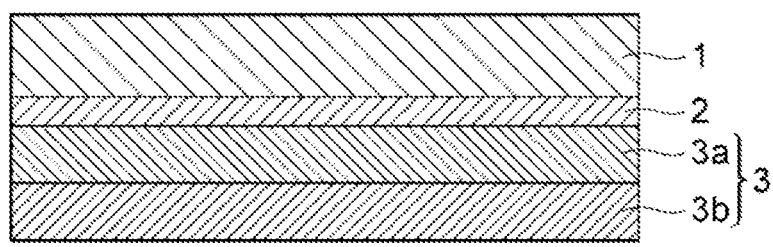
FIG. 2 is a schematic cross-sectional view of a laminate according to another embodiment of the present invention.

FIG. 2 is a schematic cross-sectional view of a laminate according to another embodiment of the present invention. A laminate 20 of this other embodiment includes a substrate layer 1, an adhesive layer 2, and a sealant layer 3 including a first polyester film 3a and a second polyester film 3b, in this order.

[Substrate Layer]

A substrate layer is a film (base film) serving as a support. Examples of such a film include a polyester film, a polyolefin film, and a polyamide film. The substrate layer may be comprised of a selected one of these films. Alternatively, the substrate layer may be a laminate of two or more films each being a selected one of the above films.

From the viewpoint of improving gas barrier properties to, for example, water vapor and oxygen, the substrate layer may have a vapor deposited layer of inorganic oxide disposed on at least one of its surfaces. The vapor deposited layer of inorganic oxide provides good barrier properties while not affecting the recyclability of the laminate because of its extremely small thickness. Examples of the inorganic oxide include aluminum oxide, silicon oxide, magnesium oxide, and tin oxide. From the viewpoint of transparency and barrier properties, the inorganic oxide may be selected from the group consisting of aluminum oxide, silicon oxide, and magnesium oxide. The thickness of the vapor deposited layer of inorganic oxide may be preferably 5 nm or more and 100 nm or less, and more preferably 10 nm or more and 50 nm or less. The thickness of the vapor deposited layer of inorganic oxide being 5 nm or more provides good barrier properties, and when the thickness thereof is 100 nm or less, the flexibility of the laminate can be maintained easily. The vapor deposited layer may be formed by, for example, physical vapor deposition or chemical vapor deposition.

Since the sealant layer is comprised of a polyester film, using a polyester film as the substrate layer (i.e., using a substrate layer comprised of a polyester film) results in the material of all the films of the laminate being polyester. The recyclability of the laminate is further improved when its components are made of the same material. From this viewpoint, the substrate layer may be comprised of a polyester film. To sufficiently perform functions as a substrate layer, the polyester film may be a film of, for example, polybutylene terephthalate, polybutylene naphthalate, or polyethylene terephthalate. These polyesters may be crystalline polyesters.

From the viewpoint of reducing the environmental load, the substrate layer may contain a biomass polyester resin made using a biomass-derived ethylene glycol as a diol unit.

From the viewpoint of reducing the environmental load, the substrate layer may contain a regenerated polyester resin. Examples of regenerated polyester resins include chemically recycled polyester resins, which are produced by chemically recycling containers made from a polyester resin composed primarily of ethylene terephthalate units, and mechanically recycled polyester resins, which are produced by mechanically recycling containers made from a polyester resin composed primarily of ethylene terephthalate units.

The substrate layer may include a plurality of polyester films. In this case, the polyester films may be the same as or different from each other. In addition, at least one of the polyester films may have a vapor deposited layer of inorganic oxide disposed on its surface.

The thickness of the substrate layer may be preferably 5 μm to 1 mm, more preferably 5 to 800 μm, and even more preferably 5 to 500 μm. In the case where the substrate layer includes a plurality of films described above, the total thickness of these films may be within the above range.

In terms of gas barrier properties and water vapor barrier properties, the laminate may further include a metal layer (metal foil) in place of, or in addition to, a vapor deposited layer of inorganic oxide. That is, the laminate may further include a metal layer between the substrate layer and the adhesive layer.

The metal layer may be a metal foil composed of, for example, aluminum or stainless steel. From the viewpoint of humidity resistance, processability such as ductility and malleability, cost, and the like, an aluminum foil is preferable. As the aluminum foil, a general-purpose soft aluminum foil can be used. Among others, an iron-containing aluminum foil is preferred in view of having good pinhole resistance as well as ductility and malleability during forming.

In the case where the metal layer is provided, its thickness may be preferably 7 to 50 μm and more preferably 9 to 15 μm in view of barrier properties, pinhole-resistance, and formability.

[Adhesive Layer]

The adhesive component of the adhesive layer may, for example, be a two-part curable type polyurethane adhesive, in which a bifunctional or higher functional aromatic or aliphatic isocyanate compound as a curing agent is reacted with a base resin, such as polyester polyol, polyether polyol, or acrylic polyol.

The adhesive layer can be formed by applying the adhesive component to the substrate layer, followed by drying. When a polyurethane adhesive is used, the polyurethane adhesive is applied to the substrate layer, followed by aging at 40° C. for 4 days or more, for example. This advances the reaction of the hydroxyl group of the base resin with the isocyanate group of the curing agent, thus achieving firm adhesion.

From the viewpoint of adhesion, followability, formability, and the like, the thickness of the adhesive layer may be preferably 2 to 50 μm and more preferably 3 to 20 μm.

[Sealant Layer]

The sealant layer is a layer that includes one or more polyester films as described above and imparts sealability to the laminate by heat sealing. The sealant layer may be comprised of a polyester film. The polyester film constituting the sealant layer may be referred to as, for example, a polyester layer (polyester resin layer).

A polyester film used as the sealant layer has a specific crystallinity. The crystallinity of the polyester film can be obtained by a process including performing FT-IR analysis using a reflection method and determining crystallinity using the formulas (1) and (2) below. Note that a first constant p1 and a second constant p2 can be determined by subjecting an amorphous PET film and crystalline PET film to FT-IR analysis, substituting $I_{1340}$, $I_{1370}$, and $I_{1409}$ into the following Formula 1, and solving simultaneous equations.

$$I_{1409} = p1 \times I_{1340} + p2 \times I_{1370} \quad \text{(Formula 1)}$$

$$C = p1 \times (I_{1340}/I_{1409}) \times 100 \quad \text{(Formula 2)}$$

where

C represents the crystallinity in percent, $I_{1409}$ represents absorbance at a wavenumber of 1409 cm$^{-1}$, $I_{1370}$ represents absorbance at a wavenumber of 1370 cm$^{-1}$, and $I_{1340}$ represents absorbance at a wavenumber of 1340 cm$^{-1}$.

The FT-IR analysis using a reflection method can be performed on the polyester film as follows.

The measurement surface of the polyester film is brought into contact with a prism, and the absorbance of the polyester film is measured using a single-reflection ATR measuring device. The prism may be zinc selenide (ZnSe), germanium (Ge), or the like. The absorbance of the polyester film at each peak is calculated using, as a baseline (zero point), a straight line connecting a first point and a second point, the first point indicating the absorbance at a wavenumber from which the peak of a wavenumber of 1409 cm$^{-1}$ rises from the high-wavenumber side of the absorption spectrum, the second point indicating the absorbance at a wavenumber from which the peak of a wavenumber of 1340 cm$^{-1}$ rises from the low-wavenumber side of the absorption spectrum.

The sealant layer includes a polyester film (first polyester film) having a crystallinity of 20 to 50%. The crystallinity of 20% or more reduces the extent to which the mechanical properties of the polyester film are deteriorated due to acidic or alkaline substances contained in a packaging bag. Polyesters generally undergo hydrolysis due to acidic or alkaline substances and will have degraded mechanical properties. If this deterioration proceeds in the sealant layer of the laminate, the sealant layer may break under pressure from outside the packaging bag or upon impact when the packaging bag is dropped or the like. Whereas the extent of the above deterioration is larger particularly when the polyester film has a lower crystallinity, a polyester film having a crystallinity of 20% or more reduces the extent of the deterioration. On the other hand, a polyester film having a crystallinity of 50% or less enables the sealant layer to have a sufficient seal strength when heat sealed. The mechanism by which sealing of the polyester film occurs includes bonding at the amorphous parts thereof, which are fluidized when heated to a glass transition temperature or higher, and bonding at the crystalline parts thereof, which are fluidized when heated to a melting point or more. When the polyester film has an excessively high crystallinity, bonding due to fluidization of the amorphous parts does not occur. In this case, the polyester film is particularly inferior in low-temperature sealability, which makes it difficult to obtain a sufficient seal strength for a packaging bag. If the sealant layer has an insufficient seal strength, pressure from outside a packaging bag or impact when the packaging bag is dropped or the like would cause sealed surfaces to separate, resulting in the packaging bag leaking its contents. In this respect, setting the crystallinity of the polyester film as a sealing surface to 50% or less enables the sealant layer to have a sufficient seal strength for a packaging bag. In light of this, the crystallinity of the first polyester film may be preferably 20 to 45% and more preferably 25 to 40%.

The sealant layer may further include a second polyester film so disposed as to be farther away from the adhesive layer than the first polyester film is, that is, on a sealing surface side of the laminate. The second polyester film may have a crystallinity of 15% or less. In this case, the second polyester film has sufficient fluidity when heated to a glass transition temperature or higher, which means that the sealant layer has improved low-temperature sealability and thus is excellent in bag-forming suitability, filling suitability (in particular, high-speed filling suitability in continuous filling), and the like. From this viewpoint, the second polyester film may have a crystallinity of 10% or less. The lower limit on the crystallinity of the second polyester film may be 2%.

By including the second polyester film more suitable as a sealing surface in addition to the first polyester film, a laminate having low-temperature sealability, acid resistance, and alkali resistance is provided.

The crystallinity of a polyester film can be adjusted by changing the type of monomers used for copolymerization. The crystallinity of a polyester film can also be adjusted by changing a cooling rate during production of the polyester film to adjust the extent to which the crystallization thereof proceeds. The crystallinity of a deposited polyester film can also be adjusted by heat-treating the film. The crystallinity of a polyester film can also be adjusted by changing deposition conditions such as a heat-setting temperature and a stretch ratio. A polyester film may be produced, for example, by polycondensation of diols and dicarboxylic acids.

Diols may be aliphatic diols or alicyclic diols, and examples thereof include compounds such as ethylene glycol, diethylene glycol, triethylene glycol, 1,2-propylene glycol, 1,3-propylene glycol, dipropylene glycol, trimethylene glycol, tetramethylene glycol, pentamethylene glycol, hexamethylene glycol, octamethylene glycol, nonamethylene glycol, decamethylene glycol, neopentyl glycol, 1,4-butanediol, and 1,4-cyclohexanedimethanol. These compounds may be used alone or in combination of two or more. From the viewpoint of reducing the environmental load, a biomass-derived ethylene glycol may be used.

Dicarboxylic acids may be aliphatic dicarboxylic acids, alicyclic dicarboxylic acids, aromatic dicarboxylic acids, or the like. Examples thereof include compounds such as oxalic acid, malonic acid, succinic acid, glutaric acid, adipic acid, pimelic acid, suberic acid, glutaconic acid, azelaic acid, sebacic acid, nonanedicarboxylic acid, decanedicarboxylic acid, undecanedicarboxylic acid, dodecanedicarboxylic acid, maleic acid, fumaric acid, mesaconic acid, citraconic acid, itaconic acid, isophthalic acid, terephthalic acid, n-dodecyl succinic acid, n-dodecenyl succinic acid, cyclohexanedicarboxylic acid, an anhydride of these acids, and a lower alkyl ester of these acids. These compounds may be used alone or in combination of two or more.

To sufficiently perform functions as a sealant layer, the polyester film may be a film of, for example, polybutylene terephthalate, polybutylene naphthalate, or polyethylene terephthalate.

From the viewpoint of reducing the environmental load, the sealant layer may contain a regenerated polyester resin. Examples of regenerated polyester resins include chemically recycled polyester resins, which are produced by chemically recycling containers made from a polyester resin composed primarily of ethylene terephthalate units, and mechanically recycled polyester resins, which are produced by mechanically recycling containers made from a polyester resin composed primarily of ethylene terephthalate units.

The sealant layer may further include other polyester films in addition to the first and second polyester films. In this case, the other polyester films may be the same as or different from each other. When the sealant layer includes two or more polyester films in addition to the first and second polyester films, the polyester film to be the innermost layer of a packaging bag or the like needs to be the first polyester film, which has a crystallinity of 20 to 50%, or the second polyester film having a crystallinity of 15% or less.

The polyester films constituting the sealant layer may contain various types of additives such as a flame retardant, slip agent, anti-blocking agent, antioxidant, light stabilizer, and tackifier.

From the viewpoint of ensuring excellent strength and filling suitability, the thickness of the sealant layer may be preferably 15 μm or more, more preferably 15 to 100 μm, and even more preferably 20 to 60 μm. The sealant layer having a thickness of less than 15 μm tends to have insufficient seal strength depending on the size of the laminate or the amount of contents. Such a sealant layer also tends to increase the mass ratio of an adhesive or ink in the laminate. In the case where the sealant layer includes a plurality of polyester films, the total thickness of these films may be within the above range.

In the case where the sealant layer includes the first and second polyester films and these films each have a thickness of 5 μm or more, the second polyester film, which is to form a sealing surface, allows excellent sealability to be easily ensured, and the first polyester film allows excellent acid resistance and alkali resistance to be easily ensured. From this viewpoint, the thickness of the second polyester film may be preferably 10 μm or more and more preferably 15 μm or more, and the thickness of the first polyester film may be preferably 10 μm or more and more preferably 15 μm or more.

The laminate may have a water vapor transmission rate of 5 $g/m^2/day$ or less. The laminate may have an oxygen transmission rate of 1 $cc/m^2/day$ or less. These configurations prevent the contents from being deteriorated by water vapor or oxygen, making it possible to maintain the quality of the contents for the long term. From this viewpoint, the water vapor transmission rate of the laminate may be preferably 1 $g/m^2/day$ or less and more preferably 0.5 $g/m^2/day$ or less. In addition, the oxygen transmission rate of the laminate may be preferably 0.5 $cc/m^2/day$ or less and more preferably 0.2 $cc/m^2/day$ or less. Note that when the laminate further includes a metal layer, the water vapor transmission rate and oxygen transmission rate tend to be reduced.

The laminate is suitable for forming a bag for use as packaging of acidic or alkaline substances. The acidic substances may have a pH less than or equal to 6.5 or 6. The alkaline substances may have a pH greater than or equal to 7.5 or 8. Examples of the above substances include liquid products such as liquid seasonings, toiletries, and liquid detergents. The laminate described above can be used to produce a packaging bag having excellent preservability of not only acidic foods, such as table vinegar and lemon juice, but also shampoo or alkaline detergents containing a surfactant (i.e., having high penetration of components).

The laminate may be formed, for example, by laminating a substrate layer and a sealant layer with an adhesive layer interposed therebetween. These layers may be laminated by, for example, dry lamination.

In the case where the laminate further includes a metal layer, the metal layer may be laminated on the substrate layer by dry lamination as mentioned above, thus producing a laminate that includes a substrate layer, adhesive layer, metal layer, adhesive layer, and sealant layer.

In the case where the sealant layer includes a plurality of polyester films, polyesters may be co-extruded for lamination, and the resulting film may be prepared as the sealant layer. Layers (films) of the same type of resin generally tend to have a greater interlayer strength when laminated by co-extrusion than when laminated by dry lamination. The interlayer strength affects a seal strength and a compressive strength, and thus co-extrusion is suitable.

A packaging bag is obtained by heat sealing facing sealant layers of laminates. A packaging bag may be obtained, for example, by heat sealing three edges of laminates with their sealant layers facing each other. Further, a package is obtained by filling the packaging bag with substances and sealing the bag. A package may be obtained, for example, by filling the packaging bag with substances through the remaining edges of the laminates, which have not been heat sealed, and then heat sealing the remaining edges.

EXAMPLES

The present invention will be described in more detail using the following examples, but the present invention is not limited to the examples.

[Production of Sealant Film]

Resins for forming polyester films were prepared using monomers listed in Table 1 as starting materials. In Table 1, TPA refers to terephthalic acid, EG refers to ethylene glycol, PG refers to neopentyl glycol, BDO refers to 1,4-butanediol, DEG refers to diethylene glycol, and CHDM refers to 1,4-cyclohexanedimethanol.

TABLE 1

|  | Carboxylic acid component | Diol component | | | | |
|---|---|---|---|---|---|---|
|  | TPA | EG | NPG | BDO | DEG | CHDM |
| Resin 1 | 100 | 60 | — | — | 5 | 35 |
| Resin 2 | 100 | 80 | — | — | 5 | 15 |
| Resin 3 | 100 | 70 | 19 | 9 | 2 | — |

Sealant Film A:

The resin 2 was extruded by casting and the extruded film was stretched in a film feeding direction (hereafter "MD") at a stretch ratio of 3 to obtain a sealant film A. The extruded film was stretched to have a thickness of 30 μm.

Sealant Film B:

The sealant film A was fed through a roll-to-roll drying oven to obtain a sealant film B. The temperature in the drying oven was set to 170° C., and the feeding speed was adjusted so that the film was heated for one minute.

Sealant Film C1:

The resin 3 was extruded by casting and the extruded film was stretched in the MD at a stretch ratio of 3 to obtain a sealant film C1. The extruded film was stretched to have a thickness of 30 μm.

Sealant Film C2:

A sealant film C2 was obtained using the same method as for the sealant film C1 except that the extruded film was stretched to have a thickness of 15 μm.

Sealant Film D:

The sealant film C1 was fed through a roll-to-roll drying oven to obtain a sealant film D. The temperature in the drying oven was set to 170° C., and the feeding speed was adjusted so that the film was heated for one minute.

Sealant Film E:

The resin 2 and resin 3 were co-extruded by casting and the extruded film was stretched in the MD at a stretch ratio of 3 to obtain a two-layered sealant film E. The surface of the layer of extruded resin 2 was selected to be the sealing surface. The extruded film was stretched to cause the layers of the resin 2 and resin 3 to have a thickness of 15 μm.

Sealant Film F1:

The resin 1 and resin 3 were co-extruded by casting and the extruded film was stretched in the MD at a stretch ratio of 3 to obtain a two-layered sealant film F1. The surface of the layer of extruded resin 1 was selected to be the sealing surface. The extruded film was stretched to cause the layers of the resin 2 and resin 3 to have a thickness of 15 μm.

Sealant Film F2:

A sealant film F2 was obtained using the same method as for the sealant film F1 except that the extruded film was stretched to cause each layer of the sealant film F2 to have a thickness of 10 μm.

Sealant Film F3:

A sealant film F3 was obtained using the same method as for the sealant film F1 except that the layer of the resin 1 was formed to have a thickness of 15 μm and the layer of the resin 3 was formed to have a thickness of 5 μm.

Sealant Film F4:

A sealant film F4 was obtained using the same method as for the sealant film F1 except that the layer of the resin 1 was formed to have a thickness of 5 μm and the layer of the resin 3 was formed to have a thickness of 15 μm.

Sealant Film G:

The resin 1 was extruded by casting and the extruded film was stretched in the MD at a stretch ratio of 3 to obtain a sealant film G. The extruded film was stretched to have a thickness of 30 μm.

Sealant Film H:

The sealant film C1 was fed through a roll-to-roll drying oven to obtain a sealant film H. The temperature in the drying oven was set to 170° C., and the feeding speed was adjusted so that the film was heated for three minutes.

(Measurement of Crystallinity of Polyester Film)

The crystallinity of each polyester film constituting the respective sealant films was measured. Specifically, the crystallinity of each polyester film was measured by a process including performing FT-IR analysis using a reflection method and determining crystallinity using the formulas (1) and (2) below. Firstly, a commercially available A-PET film and a commercially available crystalline stretched PET film were subjected to FT-IR analysis using a reflection method, and values of absorbance $I_{340}$, $I_{370}$, and $I_{409}$ were substituted into the following Formula 1, and simultaneous equations were solved to determine a first constant p1 and a second constant p2. Subsequently, the produced sealant films were subjected to FT-IR analysis using a reflection method, and values of absorbance $I_{1340}$ and $I_{1409}$ and the first constant p1 determined as above were substituted into the following Formula 2 to calculate crystallinity.

$$I_{1409} = p1 \times I_{1340} + p2 \times I_{1370} \quad \text{(Formula 1)}$$

$$C = p1 \times (I_{1340}/I_{1409}) \times 100 \quad \text{(Formula 2)}$$

where

C represents the crystallinity in percent, $I_{1409}$ represents absorbance at a wavenumber of 1409 $cm^{-1}$, $I_{1370}$ represents absorbance at a wavenumber of 1370 $cm^{-1}$, and $I_{1340}$ represents absorbance at a wavenumber of 1340 $cm^{-1}$.

The FT-IR analysis using a reflection method was performed on the sealant film as follows.

The measurement surface of the sealant film was brought into contact with a prism, and the absorbance of the sealant film was measured using a single-reflection ATR measuring device. The prism was germanium (Ge). The absorbance of the polyester film at each peak was calculated using, as a baseline (zero point), a straight line connecting a first point and a second point, the first point indicating the absorbance at a wavenumber from which the peak of a wavenumber of 1409 $cm^{-1}$ rose from the high-wavenumber side of the absorption spectrum, the second point indicating the absorbance at a wavenumber from which the peak of a wavenumber of 1340 $cm^{-1}$ rose from the low-wavenumber side of the absorption spectrum.

[Production of Laminate]

Example 1

A 12 μm crystalline stretched PET film as a base film, an aluminum foil having a thickness of 9 and a sealant film B were prepared, and these were laminated on each other by dry lamination to obtain a laminate. A general-purpose urethane adhesive was used for dry lamination. The amount of coating of the urethane adhesive was adjusted so that the adhesive would have a thickness of 3 g/m² (thickness of 3 μm) after drying.

Example 2

A laminate was obtained using the same method as for Example 1 except that a sealant film C1 was used instead of the sealant film B.

Example 3

A 12 μm crystalline stretched PET film was prepared as a base film, and a silica deposited film was provided on one surface of the PET film as a barrier layer to obtain a barrier film. A surface of the silica deposited film of the barrier film and the sealant film C1 were laminated on each other by dry lamination to obtain a laminate. A general-purpose urethane adhesive was used for dry lamination. The amount of coating of the urethane adhesive was adjusted so that the adhesive would have a thickness of 3 g/m$^2$ (thickness of 3 μm) after drying.

Example 4

A laminate was obtained using the same method as for Example 3 except that the sealant film D was used instead of the sealant film C1.

Example 5

A laminate was obtained using the same method as for Example 3 except that a sealant film C2 was used instead of the sealant film C1.

Example 6

A laminate was obtained using the same method as for Example 3 except that a sealant film E was used instead of the sealant film C1.

Example 7

A laminate was obtained using the same method as for Example 3 except that a sealant film F1 was used instead of the sealant film C1.

Example 8

A laminate was obtained using the same method as for Example 3 except that a sealant film F2 was used instead of the sealant film C1.

Example 9

A laminate was obtained using the same method as for Example 3 except that a sealant film F3 was used instead of the sealant film C1.

Example 10

A laminate was obtained using the same method as for Example 3 except that a sealant film F4 was used instead of the sealant film C1.

Comparative Example 1

A laminate was obtained using the same method as for Example 3 except that a sealant film A was used instead of the sealant film C1.

Comparative Example 2

A laminate was obtained using the same method as for Example 3 except that a sealant film G was used instead of the sealant film C1.

Comparative Example 3

A laminate was obtained using the same method as for Example 3 except that a sealant film H was used instead of the sealant film C1.

[Evaluations]

The laminates thus obtained were subjected to various evaluations. The results are shown in Tables 2 and 3.

(Measurement of Seal Strength)

Sealant layers of two pieces of each laminate were heat sealed under the conditions that a temperature was 160° C., 180° C., and 200° C., an air pressure was 0.2 MPa, and a sealing time was one minute. The seal strength of the heat-sealed sealant layers of each laminate was measured according to JIS K7127.

(Measurement of Oxygen Transmission Rate and Water Vapor Transmittance Rate)

An oxygen transmittance rate and a water vapor transmission rate of each laminate were measured according to JIS K7126B.

(Pressure Resistance Test)

Two 90 mm-square pieces were cut from each laminate, three edges of the two pieces of each laminate were sealed with their sealant layers facing each other, 30 grams of substances were filled therein, and the remaining edges of the pieces were sealed. The sealing conditions were the same as those used when the highest seal strength was obtained in the measurement of seal strength described above. The seal width was set to 5 mm from the periphery of the pieces.

As substances to be filled, alkaline detergents (pH=11), alkaline detergents (pH=8), water (pH=7), shampoo (pH=6), acidic detergents (pH=3), and table vinegar (pH=3) were prepared.

The packages containing these substances were evaluated according to the following criteria.

Evaluation Criteria (Pressure Resistance):
  A rating: having resistance to a dynamic load of 300 kgf or more during dynamic load testing
  B rating: having resistance to a dynamic load of less than 300 kgf during dynamic load testing, and not broken when subjected to a static load of 100 kg for one minute during static load testing
  C rating: broken when subjected to a static load of 100 kg for one minute during static load testing The static load testing was performed according to JIS Z 0238. During the dynamic load testing, the package was compressed at a rate of 10 mm/min, and the maximum dynamic load applied to the package at break was recorded.

TABLE 2

|  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Substrate layer | | PET | PET | PET with vapor deposited layer of inorganic oxide | PET with vapor deposited layer of inorganic oxide | PET with vapor deposited layer of inorganic oxide | PET with vapor deposited layer of inorganic oxide | PET with vapor deposited layer of inorganic oxide | PET with vapor deposited layer of inorganic oxide | PET with vapor deposited layer of inorganic oxide | PET with vapor deposited layer of inorganic oxide |
| Metal layer | | AL | AL | — | — | — | — | — | — | — | — |
| Type of sealant film | | B | C1 | C1 | D | C2 | E | F1 | F2 | F3 | F4 |
| Crystallinity/thickness of sealant film | | 20%/30 μm | 40%/30 μm | 40%/30 μm | 50%/30 μm | 40%/15 μm | 40%/15 μm 15%/15 μm | 40%/15 μm 10%/15 μm | 40%/10 μm 10%/10 μm | 40%/5 μm 10%/15 μm | 40%/15 μm 10%/5 μm |
| Oxygen transmission rate | cc/m$^2$/day | 0.05> | 0.05> | 0.2 | 0.2 | 0.2 | 0.2 | 0.2 | 0.2 | 0.2 | 0.2 |
| Water vapor transmission rate | g/m$^2$/day | 0.01> | 0.01> | 0.5 | 0.5 | 0.5 | 0.5 | 0.5 | 0.5 | 0.5 | 0.5 |
| Seal strength when heat sealed at 160° C. | N/15 mm | 1> | 1> | 1> | 1> | 1> | 12 | 20 | 16 | 18 | 8 |
| Seal strength when heat sealed at 180° C. | N/15 mm | 10 | 8 | 13 | 1> | 6 | 20 | 25 | 18 | 20 | 9 |
| Seal strength when heat sealed at 200° C. | N/15 mm | 23 | 22 | 23 | 15 | 13 | 23 | 22 | 16 | 18 | 9 |
| Pressure resistance test | Alkaline detergent (pH = 11) | B | B | B | B | B | B | B | B | B | B |
| | Alkaline detergent (pH = 8) | B | A | A | B | B | A | A | B | B | B |
| | Water (pH = 7) | A | A | A | A | A | A | A | A | A | B |
| | Shampoo (pH = 6) | A | A | A | A | A | A | A | A | A | B |
| | Acidic detergent (pH = 3) | B | A | A | B | B | A | A | A | A | B |
| | Table vinegar (pH = 3) | B | A | A | B | B | A | A | A | A | B |

TABLE 3

|  |  | Comparative Example 1 | Comparative Example 2 | Comparative Example 3 |
|---|---|---|---|---|
| Substrate layer | | PET with vapor deposited layer of inorganic oxide | PET with vapor deposited layer of inorganic oxide | PET with vapor deposited layer of inorganic oxide |
| Metal layer | | — | — | — |
| Type of sealant film | | A | G | H |
| Crystallinity/thickness of sealant film | | 15%/30 μm | 10%/30 μm | 60%/30 μm |
| Oxygen transmission rate | cc/m$^2$/day | 0.2 | 0.2 | 0.2 |
| Water vapor transmission rate | g/m$^2$/day | 0.5 | 0.5 | 0.5 |
| Seal strength when heat sealed at 160° C. | N/15 mm | 11 | 20 | 1> |
| Seal strength when heat sealed at 180° C. | N/15 mm | 15 | 24 | 1> |
| Seal strength when heat sealed at 200° C. | N/15 mm | 23 | 30 | 3 |
| Pressure resistance test | Alkaline detergent (pH = 11) | C | C | C |
| | Alkaline detergent (pH = 8) | C | C | C |

TABLE 3-continued

|  | Comparative Example 1 | Comparative Example 2 | Comparative Example 3 |
|---|---|---|---|
| Water (pH = 7) | A | A | C |
| Shampoo (pH = 6) | C | C | C |
| Acidic detergent (pH = 3) | C | C | C |
| Table vinegar (pH = 3) | C | C | C |

INDUSTRIAL APPLICABILITY

Laminates according to the present invention can be used to obtain a packaging bag having excellent low adsorptivity, excellent sealability, and excellent resistance to substances. Furthermore, substantially all of the constituent films of the laminates can be polyester films. Such a laminate can be referred to as a packaging material composed of a single material (mono-material) and thus is expected to have excellent recyclability.

REFERENCE SIGNS LIST

1 . . . Substrate layer; 2 . . . Adhesive layer; 3 . . . Sealant layer; 3a . . . First polyester film; 3b . . . Second polyester film; 10, 20 . . . Laminate.

What is claimed is:

1. A laminate for forming a bag for use as packaging of an acidic or alkaline substance, the laminate, comprising, in sequence:
    a substrate layer;
    an adhesive layer; and
    a sealant monolayer,
    wherein
    the sealant monolayer consists of (a) one or more polyester selected from the group consisting of polybutylene terephthalate, polybutylene naphthalate, and polyethylene terephthalate and (b) one or more optional additives selected from the group consisting of a flame retardant, slip agent, anti-blocking agent, antioxidant, light stabilizer, and tackifier,
    the sealant monolayer has a thickness from 15 μm to 60 μm;
    the laminate has a water vapor transmission rate of 0.5 g/m²/day or less;
    the laminate has an oxygen transmission rate of 0.2 cc/m²/day or less;
    and
    the sealant monolayer has a crystallinity of 20 to 50%, the crystallinity of the sealant monolayer being defined based on a first absorbance at a first wavenumber of 1409 cm⁻¹, a second absorbance at a second wavenumber of 1370 cm⁻¹, a third absorbance at a third wavenumber of 1340 cm⁻¹, a first constant, and a second constant, the first to third absorbances and the first and second constants being determined based on Fourier transform infrared (FT-IR) analysis, which uses a reflection method, on at least the sealant monolayer the crystallinity of the sealant monolayer being expressed in accordance with the following formulas (1) and (2):

$$I_{1409} = p1 \times I_{1340} + p2 \times I_{1370} \quad \text{(Formula 1)}$$

$$C = p1 \times (I_{1340}/I_{1409}) \times 100 \quad \text{(Formula 2)}$$

where
    C represents the crystallinity in percent,
    $I_{1409}$ represents the first absorbance at the first wavenumber,
    $I_{1370}$ represents the second absorbance at the second wavenumber,
    $I_{1340}$ represents the third absorbance at the third wavenumber,
    p1 represents the first constant, and
    p2 represents the second constant.

2. The laminate of claim 1, wherein the substrate layer consists of a third polyester film.

3. The laminate of claim 2, wherein the third polyester film of the substrate layer has a first surface and a second surface opposite to the first surface and wherein the laminate further comprises a vapor deposited layer of an inorganic oxide disposed on at least one of the first surface and the second surface.

4. The laminate of claim 3, wherein the inorganic oxide is silicon oxide.

5. The laminate of claim 1, wherein the substance contains a surfactant.

6. The laminate of claim 1, wherein the sealant monolayer consists of one or more polyester selected from the group consisting of polybutylene terephthalate, polybutylene naphthalate, and polyethylene terephthalate.

7. The laminate of claim 1, wherein the thickness of the sealant monolayer is from 15 μm to 30 μm.

8. A laminate for forming a bag for use as packaging of an acidic or alkaline substance, the laminate, comprising, in sequence:
    a substrate layer;
    an adhesive layer; and
    a sealant bilayer consisting of a first polyester film and a second polyester film;
    wherein
    the sealant bilayer consists of (a) one or more polyester selected from the group consisting of polybutylene terephthalate, polybutylene naphthalate, and polyethylene terephthalate and (b) one or more optional additives selected from the group consisting of a flame retardant, slip agent, anti-blocking agent, antioxidant, light stabilizer, and tackifier,
    the sealant bilayer has a thickness from 20 μm to 60 μm;
    the laminate has a water vapor transmission rate of 0.5 g/m²/day or less;
    the laminate has an oxygen transmission rate of 0.2 cc/m²/day or less;
    the second polyester film is farther away from the adhesive layer than the first polyester film is, the second polyester film having a crystallinity of 15% or less;
    the first polyester film of the sealant bilayer has a crystallinity of 20 to 50%, the crystallinity of the first polyester film of the sealant bilayer being defined based on a first absorbance at a first wavenumber of 1409 cm⁻¹, a second absorbance at a second wavenumber of 1370 cm⁻¹, a third absorbance at a third wavenumber of 1340 cm⁻¹, a first constant, and a second constant, the first to third absorbances and the first and second constants being determined based on Fourier transform infrared (FT-IR) analysis, which uses a reflection method, on at least the first polyester film of the sealant bilayer the crystallinity of the first polyester film of the sealant bilayer being expressed in accordance with the following formulas (1) and (2):

$$I_{1409} = p1 \times I_{1340} + p2 \times I_{1370} \qquad \text{(Formula 1)}$$

$$C = p1 \times (I_{1340}/I_{1409}) \times 100 \qquad \text{(Formula 2)}$$

where
C represents the crystallinity in percent,
$I_{1409}$ represents the first absorbance at the first wavenumber,
$I_{1370}$ represents the second absorbance at the second wavenumber,
$I_{1340}$ represents the third absorbance at the third wavenumber,
p1 represents the first constant, and
p2 represents the second constant.

9. The laminate of claim 8, wherein the substrate layer consists of a third polyester film.

10. The laminate of claim 9, wherein the third polyester film of the substrate layer has a first surface and a second surface opposite to the first surface and wherein the laminate further comprises a vapor deposited layer of an inorganic oxide disposed on at least one of the first surface and the second surface.

11. The laminate of claim 10, wherein the inorganic oxide is silicon oxide.

12. The laminate of claim 10, wherein the thickness of the sealant bilayer is from 20 μm to 30 μm.

13. The laminate of claim 10, wherein a thickness of the first polyester film is at least 15 μm.

14. The laminate of claim 8, wherein the substance contains a surfactant.

15. The laminate of claim 8, wherein the sealant bilayer consists of one or more polyester selected from the group consisting of polybutylene terephthalate, polybutylene naphthalate, and polyethylene terephthalate.

* * * * *